US011351451B2

(12) United States Patent
Hotaki

(10) Patent No.: US 11,351,451 B2
(45) Date of Patent: Jun. 7, 2022

(54) SYSTEM AND METHODS FOR PROVIDING WIRELESS FEEDBACK TO A VIDEO GAME

(71) Applicant: Abdul Hotaki, Oceanside, NY (US)

(72) Inventor: Abdul Hotaki, Oceanside, NY (US)

( * ) Notice: Subject to any disclaimer, the term of this patent is extended or adjusted under 35 U.S.C. 154(b) by 298 days.

(21) Appl. No.: 16/781,439

(22) Filed: Feb. 4, 2020

(65) Prior Publication Data
US 2020/0188777 A1 Jun. 18, 2020

Related U.S. Application Data

(63) Continuation of application No. 16/108,988, filed on Aug. 22, 2018, now Pat. No. 10,569,167.

(51) Int. Cl.
*A63F 13/285* (2014.01)
*A63F 13/212* (2014.01)
*A63F 13/235* (2014.01)

(52) U.S. Cl.
CPC .......... *A63F 13/285* (2014.09); *A63F 13/212* (2014.09); *A63F 13/235* (2014.09)

(58) Field of Classification Search
None
See application file for complete search history.

(56) References Cited

U.S. PATENT DOCUMENTS

| | | | |
|---|---|---|---|
| 6,422,941 B1 | 7/2002 | Thorner et al. | |
| 6,676,660 B2 | 1/2004 | Wampler et al. | |
| 9,981,182 B2 * | 5/2018 | Goslin | A63F 13/32 |
| 10,942,573 B2 * | 3/2021 | Yamano | A63F 13/24 |
| 2005/0113167 A1 | 5/2005 | Buchner et al. | |
| 2005/0255914 A1 | 11/2005 | McHale et al. | |
| 2009/0131165 A1 | 5/2009 | Buchner et al. | |
| 2010/0154102 A1 | 6/2010 | Leung et al. | |
| 2012/0190460 A1 * | 7/2012 | Sessions | A63F 13/212 463/47 |
| 2015/0105129 A1 * | 4/2015 | Chapman | A63F 13/212 463/7 |
| 2017/0232338 A1 * | 8/2017 | Goslin | A63F 13/327 463/31 |
| 2019/0054374 A1 | 2/2019 | Pesante | |

FOREIGN PATENT DOCUMENTS

| | | |
|---|---|---|
| CN | 204745623 U | 11/2015 |
| EP | 0616188 A1 | 9/1994 |

* cited by examiner

*Primary Examiner* — Ronald Laneau
(74) *Attorney, Agent, or Firm* — Robert P. Michal, Esq.; Carter, DeLuca & Farrell LLP

(57) ABSTRACT

In accordance with the present disclosure a system for providing feedback in response to a video game is provided. The system includes: a game controller configured to receive signal(s) from a video game indicating first and second feedback response(s) and a vest configured to provide feedback in response to receiving a communication from the game controller. The game controller includes a first and a second transmitter configured to transmit a first and a second signal indicating the first and second feedback response, respectively. The vest includes: a first and a second receiver configured to receive the first and second signal from the first and second transmitter, a first feedback and second device that provides feedback in response to the first and second signal, the first and second feedback device being disposed on a first and second portion of the vest, respectively.

19 Claims, 6 Drawing Sheets

SYSTEM AND METHODS FOR PROVIDING WIRELESS FEEDBACK TO A VIDEO GAME

CROSS-REFERENCE TO RELATED APPLICATIONS

This application is a continuation of U.S. patent application Ser. No. 16/108,988 filed Aug. 22, 2018, the entire disclosure of which is incorporated herein by reference in its entirety.

TECHNICAL FIELD

The present disclosure relates to providing feedback wirelessly to a user of a videogame. More particularly, the present disclosure is directed to apparel and controllers that communicate wirelessly to provide a user tactile feedback to a video game.

BACKGROUND

There have been developed a number of solutions for providing feedback in a game system. In the game console scenario there have been developed certain tactile feedback systems. One of these feedback systems vibrates your game controller in response to action in a video game.

There are times when the vibrating of the game controller can make game play more difficult to control. Though there have been developed systems enabling this feedback, there is always a need for improved and more efficient systems. Accordingly, in view of these short comings, improved solutions are desired.

SUMMARY

Embodiments of the present disclosure are described in detail with reference to the drawing figures wherein like reference numerals identify similar or identical elements.

An aspect of the present disclosure provides a system for providing feedback in response to a video game. The system includes a game controller configured to receive a first and a second signal, generated during the execution of a video game, indicating a first and a second feedback response, generating a wireless communication, and a vest configured to provide feedback in response to receiving the wireless communication from the game controller. The game controller includes a first transmitter configured to transmit the first signal generated by the game controller indicating the first feedback response, and a second transmitter configured to transmit the second signal generated by the game controller indicating the second feedback response. The vest includes a first receiver configured to receive the first signal from the first transmitter, a second receiver configured to receive the second signal from the second transmitter, a first feedback device that provides feedback in response to the first signal, the first feedback device being disposed on a first portion of the vest, and a second feedback device that provides feedback in response to the second signal, the second feedback device being disposed on the second portion of the vest.

In one aspect, the first feedback device includes at least one circuit configured to actuate a first plurality of motors, and the second feedback device includes at least one circuit configured to actuate a second plurality of motors. The first plurality of motors include a shaft and a weight disposed on the shaft, and the second plurality of motors include a shaft and a weight disposed on the shaft.

In another aspect of the present disclosure, the first feedback device includes at least one first circuit configured to provide a first signal and the second feedback device includes at least one second circuit configured to provide a second signal.

In yet a further aspect of the disclosure, the game controller further includes a plurality of motors configured to provide feedback in response to action occurring during execution of the video game, wherein the plurality of motors include a shaft and a weight disposed on the shaft.

In one aspect, the game controller further includes a switch configured to enable or disable the first and second feedback devices. In another aspect of the present disclosure, the first signal includes a first infrared signal at a first wavelength and the second signal includes a second infrared signal at a second wavelength.

In yet another aspect the first feedback device includes a processor and a memory operatively coupled to the processor, the memory having stored thereon instructions which when executed by the processor cause actuation of a first plurality of motors in response to the first signal, and wherein the first plurality of motors include a shaft and a weight disposed on the shaft.

In a further aspect, the second feedback device includes a processor and a memory operatively coupled to the processor, the memory having stored thereon instructions which when executed by the processor cause actuation of a second plurality of motors in response to the second signal, wherein the second plurality of motors include a shaft and a weight disposed on the shaft.

In yet a further aspect the vest further includes a first infrared filter disposed between the first receiver and the first transmitter, and a second infrared filter disposed between the second receiver and the second transmitter. In another aspect one of the first plurality of motors and one of the second plurality of motors are located in a portion of the vest that would position over the shoulders of a user during use.

In yet another aspect one of the first feedback device and the second feedback device is disposed in a shoulder portion of the vest that positions over shoulders of a user during use. In another aspect one of the first feedback device and one of the second feedback device is located in a chest portion of the vest that positions over the upper chest of a user during use.

In yet a further aspect, the vest further includes a rechargeable battery. In another aspect, the vest further includes at least one 120 degree buckle strap.

An aspect of the present disclosure provides a method for providing feedback in response to a video game. The method includes receiving, in a game controller, a first signal from a video game indicating a first feedback response, and a second signal from a video game indicating a second feedback response, transmitting, from the game controller, the first signal indicating the first feedback response, transmitting, from the game controller, the second signal indicating the second feedback response, receiving, in a vest, the first signal, receiving, in the vest, the second signal, providing a first feedback in response to the first signal, and providing a second feedback in response to the second signal.

In an aspect of the present disclosure, providing the first feedback includes actuation of a first plurality of motors disposed in the vest and providing the second feedback includes actuation of a second plurality of motors disposed in the vest. In another aspect, method further includes actuating, in the game controller, a plurality of motors in response to action occurring during execution of the video game.

In yet another aspect, the first signal includes a first infrared signal and the second signal includes a second infrared signal. In a further aspect, the first signal includes a first infrared signal at a first wavelength and the second signal includes a second infrared signal at a second wavelength.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The present disclosure is directed to systems and methods for providing feedback in response to a video game. In particular, the systems and methods of the present disclosure are useful where a person is playing a video game.

Exemplary embodiments of the systems and methods for producing feedback disclosed in the present disclosure are described in detail, although it will be apparent to those skilled in the relevant art that some features that are not necessary for an understanding of the systems and methods for producing feedback may not be shown for the sake of clarity.

Figure 1:
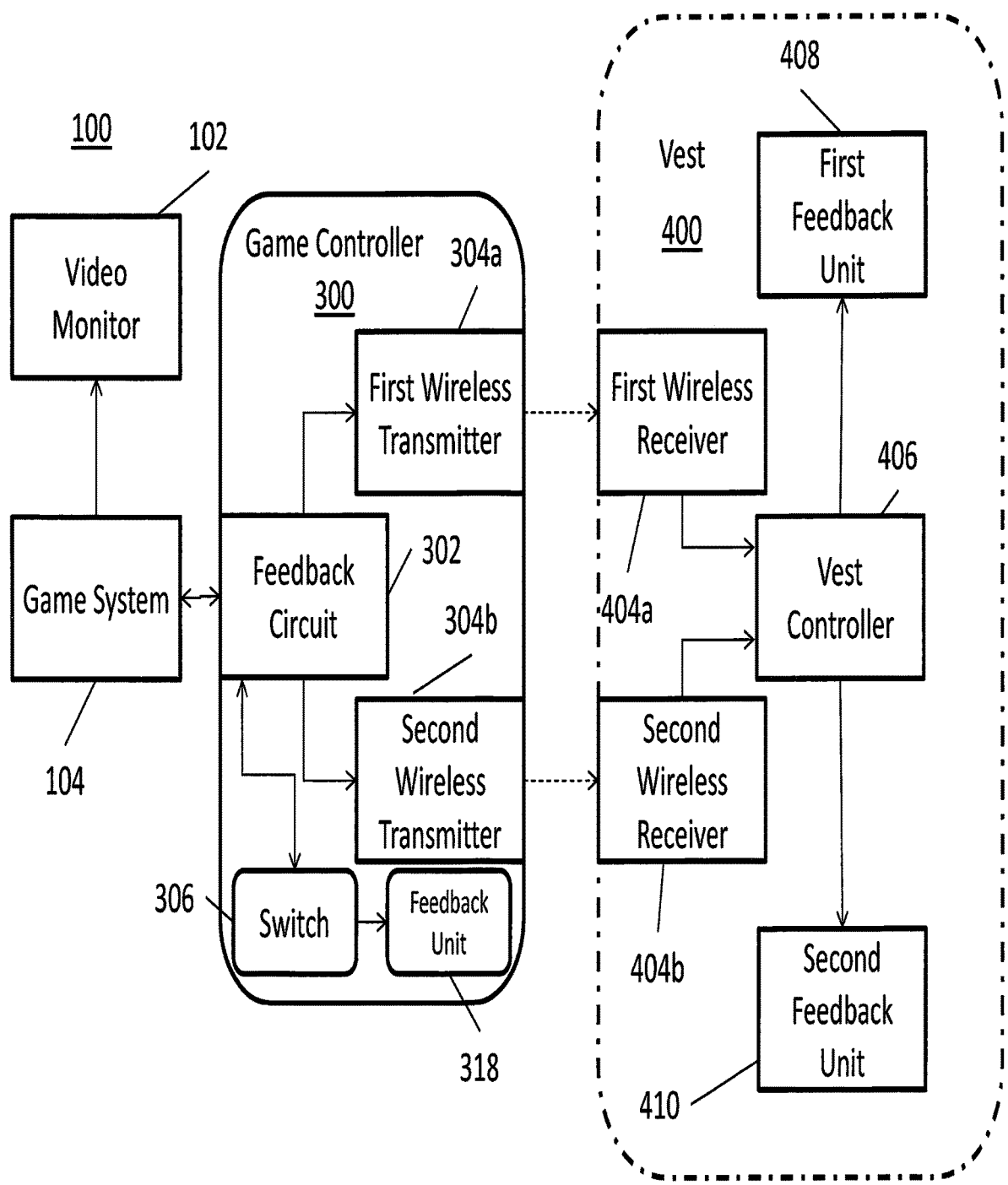
FIG. 1 depicts a block diagram of an exemplary system for providing feedback in accordance with the present disclosure.

FIG. 1 depicts a block diagram of an embodiment of a system 100 for providing feedback in response to a video game, in accordance with the present disclosure. It is contemplated that the game system 104 may include game consoles, computers, mobile devices, portable devices, and/or hand held game consoles. Typically, a game system 104 is connected to a video monitor 102 for viewing the video game for a user to view during game play. The user may control the game with a game controller 300. The terms "user," "player," "gamer," and person are all to be read interchangeably to refer to a wearer of the vest. It is contemplated that the game controller may include, for example, hand held controllers, VR controllers, and/or wireless or wired controllers. The game controller will be described in further detail below in relation to FIG. 3. The game controller 300 receives a signal from the game system 104 to provide feedback to the user. In various embodiments, the signal contains information indicating either a left or a right feedback response. In various embodiments, the signal may provide an indication of both a left and a right feedback response. It is contemplated that these multiple feedback responses may be top and bottom instead of left and right, or may include other positions or orientations. In various embodiments, the game controller 300 processes the signals and transmits them to the vest 400. The vest then processes the signals and provides the user with a feedback response via the feedback devices disposed on the vest 400.

Figure 2:
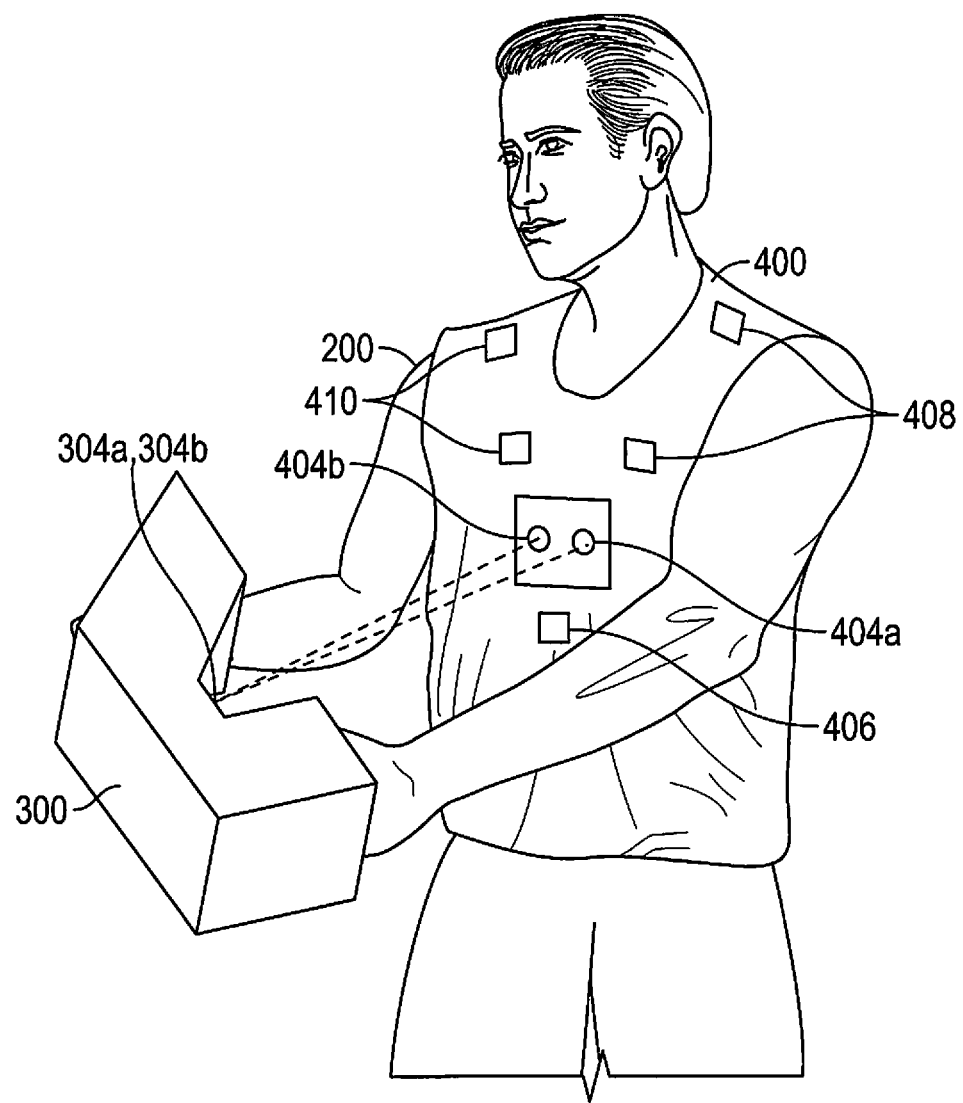
FIG. 2 depicts a perspective diagram of a user wearing an exemplary vest and holding a game controller in accordance with the present disclosure.

FIG. 2 depicts a perspective diagram of a user 200 wearing an exemplary vest 400 and holding a game controller 300 in accordance with the present disclosure. In typical use, the vest 400 is worn by the user 200, with a front panel covering the user's 200 chest. The user's 200 head passes through an aperture in the vest 400. The user 200 will typically hold the game controller 300 approximately in front of their chest during game play. Wireless signals transmit from the game controller 300 to the vest 400 during game play to provide the user 200 feedback in response to game play. In various embodiments, the first and second transmitters 304a, 304b transmit the signals to the receivers 404a, 404b respectively. In various embodiments, a vest controller 406 is disposed on the front of the vest. The vest controller 406 processes the signals received by the receivers 404a and 404b and powers the feedback devices 408, 410.

For example, if a user is playing a first person shooter game, the vest can increase the realism of the game by actuating motors to cause a vibration on the user's upper chest when the user has been shot in the game. In another example, in a racing game, when the user drives off the road only on the right ride of the car, the vest can vibrate on the left side in response. In various embodiments, other types of feedback include an audio response, such as a sound, heat, cold, and/or impact generators to provide a user feedback in response to gameplay.

Figure 3:
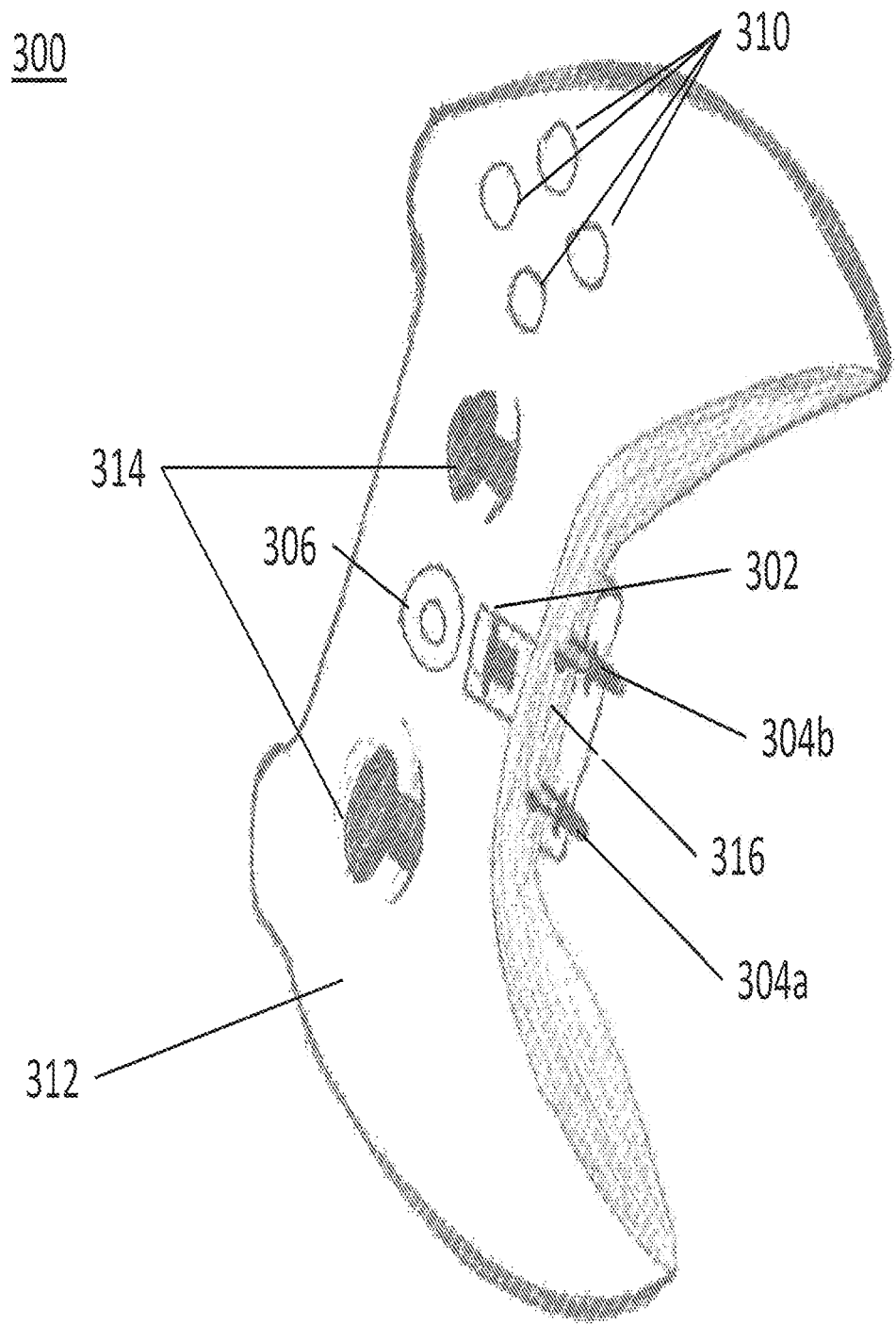
FIG. 3 depicts a perspective diagram of an illustrated embodiment of the game controller of FIG. 2 in accordance with the present disclosure.

FIG. 3 depicts a perspective diagram of an embodiment of a game controller of FIG. 2 in accordance with the present disclosure. The game controller 300 includes multiple joysticks 314, and buttons 310 disposed on the top and sides of the game controller chassis 312 for a user to interact with a game system 104 while playing a video game. In various embodiments, the buttons 310 allow the user to program the buttons to copy other buttons functions. The game controller 200 includes a feedback device 302 which processes a signal from the game system 104, a feedback device 318 which provides a user feedback in response to a video game, and a switch 306 which disables the game controller's feedback device 318. It is contemplated that the feedback device 302 includes a processor and memory. The feedback device 318 may include one or more motors which provide feedback to the user 200 by actuating in response to game play. In various embodiments, the switch 306 disables the feedback device 318 in the game controller 300, such that the user 200 may perceive feedback only in the vest 400, and not in the game controller 300.

In various embodiments, the game controller 300 also includes a first and a second wireless transmitter 304a, 304b disposed on a front surface 316 of the game controller 300 on the surface proximate to the user 200. Infrared ("IR") transmitters work by sending an IR transmission in the infrared wavelength region. In embodiments where IR transmitters are used as the first and second transmitters 304a, 304b, they may operate at two different wavelengths. Thus, allowing the user 200 to receive feedback in multiple regions of the vest 400. In various embodiments, the first and second transmitters 304a, 304b may be wired directly to the game controller's feedback device(s) 302. When the feedback device(s) 302 receive signals to provide the user feedback, this signal is then transmitted via the first and second transmitters 304a, 304b to the first and second receivers 404a, 404b. In various embodiments, when the signals are high, the feedback devices 408, 410 in the vest 400 will provide feedback. When the signal goes low, the feedback devices 408, 410 in the vest 400 will stop. The embodiments described above are exemplary, and variations are contemplated to be within the scope of the present disclosure. For example, it is contemplated that the wireless transmitters may be WIFI, Bluetooth, Near Field Communication ("NFC"), or any of a number of wireless protocols known to those practiced in the art.

Figure 4:
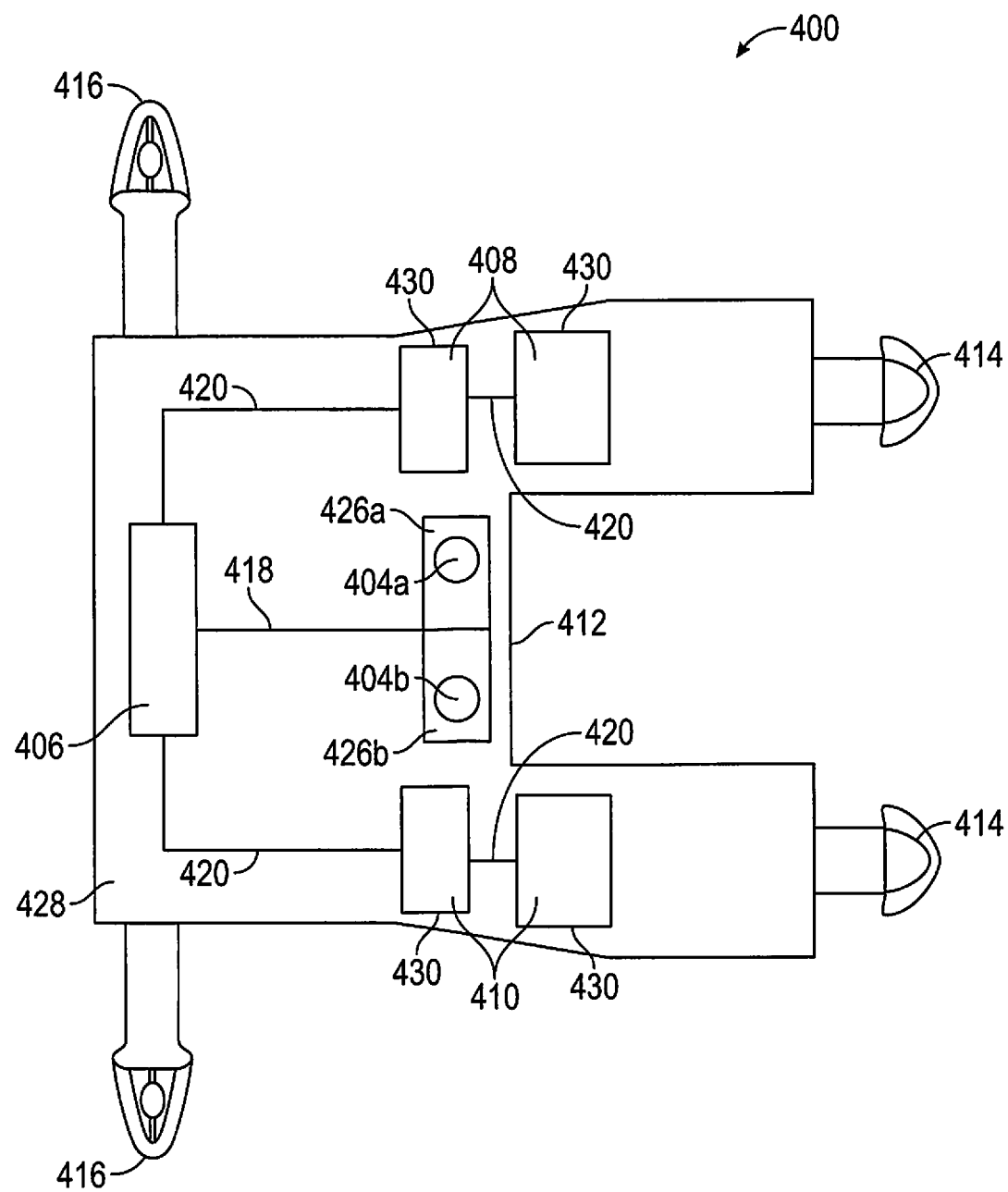
FIG. 4 depicts a diagram of an illustrated embodiment of the vest of FIG. 2 in accordance with the present disclosure.
Figure 5:
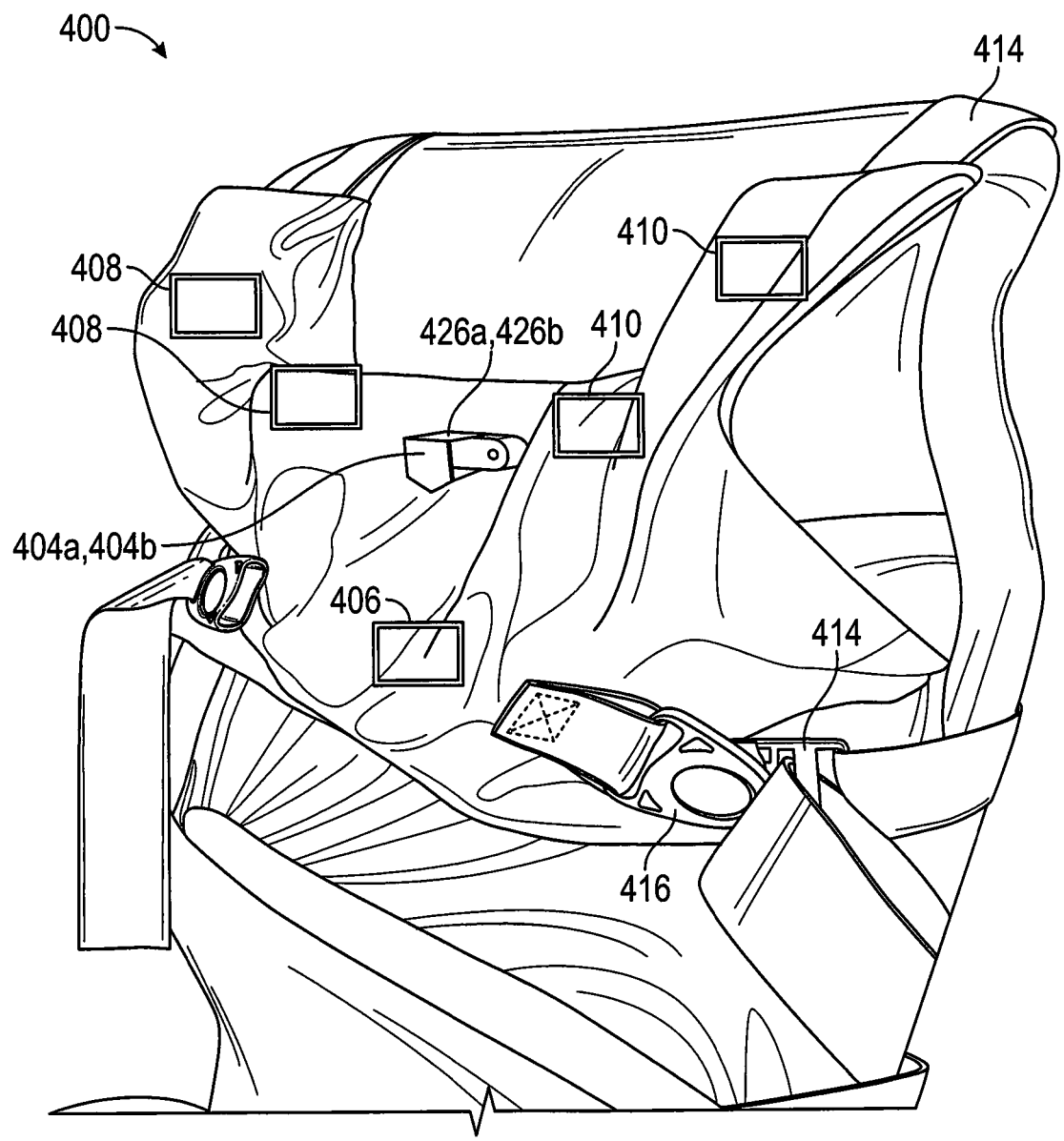
FIG. 5 depicts a perspective diagram of an illustrated embodiment of the vest of FIG. 2 in accordance with the present disclosure.

FIGS. 4 and 5 depict a diagram of an embodiment of the vest of FIG. 2 in accordance with the present disclosure. In various embodiments, the vest 400 may be a one-size fits all, low cut to feel comfortable. The vest 400 may be made of a sturdy nylon fabric with padding for example. In various embodiments, the vest 400 is worn such that it rests over the right and left shoulders of the user 200. The vest 400 includes a front panel 428 and a neckline 412. In various embodiments, disposed on the front panel 428 of the vest 400 include a vest controller 406, a first and second wireless receiver 404a, 404b, a first and second feedback device 408, 410, straps 414, 416, connecting cables 418, 420, feedback device pouches 430, and a first and second feedback device 408, 410.

In various embodiments, the front panel 428 may include straps 414, 416 along with 120 degree buckle clips. In various embodiments, the straps 414, 416 may be adjusted to fit the particular user. It is contemplated that the straps may be made of, for example, nylon, plastic, rubber, polypropylene, or other fabric. There are several feedback device pouches 430 to hold the first and second feedback devices 408, 410. For example, the first and second feedback devices 408, 410 may be disposed on the portion of the vest 400 that is positioned over the left and right shoulders (trapezius muscle) of the user 200 and over the left and right portion of the upper chest of the user 200 as can be seen in FIG. 2. It is contemplated that the first and second feedback devices 408, 410 can include one or more of vibrating motors, impact generators, sources of heat and/or cold, speakers, to provide feedback to the user. In various embodiments, other positions and configurations for the first and second feedback devices are contemplated. In various embodiments, the vest may include more than two feedback devices. In various embodiments, the shaft of each motor holds an unbalanced weight. When power is applied to the motor, it spins the weight. Because the weight is unbalanced, the motor tries to wobble. However, since the motor is securely mounted inside the vest 400, the wobble translates to a shuddering vibration.

In an embodiment, the first and second wireless receivers 404a, 404b, may have individual IR filters 426a, 426b to eliminate interference from other light sources. In various embodiments, the first and second wireless receivers 404a, 404b, and the individual IR filters 426a, 426b may be encased in a small module positioned in the center region of the front panel 428 of the vest 400. The individual IR filters 426a, 426b allow IR at the wavelengths of the first and second wireless receivers 404a, 404b to pass, and block other light sources such as visible light or ultraviolet light to reduce or eliminate interference.

In the illustrated embodiment, the vest controller 406, which may be located on the outer face of the front panel 428, includes a microprocessor, a memory, and a power source. In various embodiments, the power source may include a rechargeable battery, which may be charged by way of, for example a USB port, or other DC power port. In various embodiments, the vest controller 406 or the microprocessor may be another type of processor such as, without limitation, a digital signal processor, a field-programmable gate array (FPGA), or a central processing unit (CPU). In various embodiments, the memory can be random access memory, read only memory, magnetic memory, solid state memory, and/or another type of memory. In various embodiments, the memory can be separate from the vest controller 406 and can communicate with the microprocessor through communication buses of a circuit board and/or through communication cables such as serial ATA cables or other types of cables. In various embodiments, the memory includes machine instructions that are executable by the microprocessor to operate the vest 400. Various operations of the system are described below. Such operations can be controlled by the machine instructions executed by the microprocessor.

In various embodiments, the first and second wireless receivers 404a, 404b receive wireless signals transmitted by the game controller 300 during game play. In various embodiments, the vest controller 406 may be connected to the first and second wireless receivers 404a, 404b by way of cables or wires 418. The vest controller receives a first and a second signal from the first and second wireless receivers 404a, 404b. This signal is processed by the vest controller 406 and the resulting signals are sent by the vest controller 406 to the first and second feedback devices 408, 410 by way of cables or wires 420 to provide feedback to the user 200.

Figure 6:
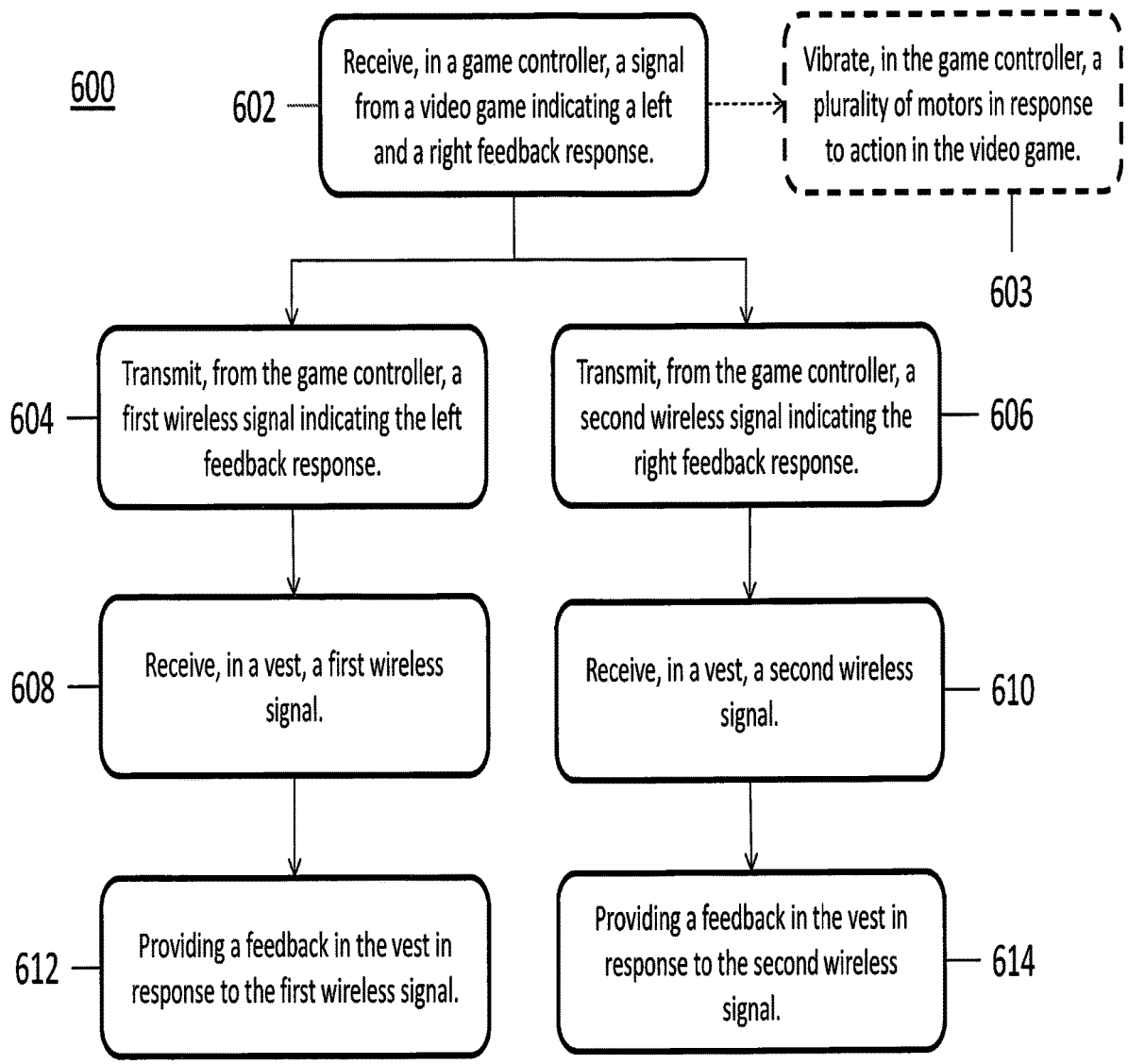
FIG. 6 depicts a logic flow chart for a control algorithm in accordance with the present disclosure.

FIG. 6 depicts a logic flow chart for a feedback operation in accordance with the present disclosure. The control algorithm 600 is an embodiment of various blocks. However, those skilled in the art will appreciate that one or more blocks of the method 600 may be performed in a different order, repeated, and/or omitted without departing from the scope of the present disclosure. Further, the below description of the method 600 refers to various actions or tasks performed by the feedback device 302 and the vest controller 406, but those skilled in the art will appreciate that in some instances, the feedback device 302 and the vest controller 406 performs the actions or tasks via one or more software applications, such as the application which could be firmware, executing on either the feedback device 302 or the vest controller 406.

Initially, at block 602, the game controller 300 receives a signal from a video game indicating a left feedback response and a right feedback response. For example, this feedback response may be in response to game play where a car goes off road, or where a game character is firing a gun or getting shot. The feedback device 302 in the game controller 300 processes this signal and transmits it to an internal feedback device 318 and/or a first wireless transmitter 304a and a second wireless transmitter 304b. Optionally, at block 603, the internal feedback device 318 will provide the user 200 feedback by, for example, at least vibrating the game controller 300. However, this optional functionality may be disabled by using the switch 306.

At block 604, the first wireless transmitter 304a transmits a first wireless signal indicating the left feedback response. In an embodiment, the first wireless transmitter may be an IR transmitter at a first wavelength. In parallel, at block 606 the second wireless transmitter transmits 304b, a second wireless signal indicating the right feedback response. In an embodiment, the second wireless transmitter may be an IR transmitter at a second wavelength.

Next, at block 608, the first wireless receiver 404a, located on the vest 400, receives the first wireless signal. In an embodiment, the IR signal passes through an individual IR filter 426a, prior to being received by the first wireless receiver 404a. In parallel, at block 610, the second wireless receiver 404b, located on the vest 400, receives the second wireless signal. In an embodiment, the IR signal passes through an individual IR filter 426b, prior to being received by the second wireless receiver 404b. The first and second wireless signals are transmitted to the vest controller 406 for further processing. The vest controller 406 then conditions the voltages such that they are at an appropriate level to control the first and second feedback devices 408, 410.

At block 612, the vest controller 406 transmits the conditioned voltage to the first feedback devices 408, which then provide a first feedback in response to the first wireless signal. At block 614, the vest controller 406 transmits the conditioned voltage to the second feedback devices 410, which then provide a second feedback in response to the second wireless signal. In an embodiment, the first and second feedback devices 408, 410 include a motor which may vibrate in response to the signals from the vest controller 406.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A system for providing feedback in response to a video game, the system comprising:
    a game controller configured to generate a wireless communication and including a first transmitter configured to transmit a first signal; and
    a vest configured to provide feedback in response to receiving the wireless communication from the game controller, the vest including:
    a first receiver configured to receive the first signal from the first transmitter; and
    a first feedback circuit configured to provide feedback in response to the first signal, wherein the game controller further includes a second transmitter configured to transmit a second signal, and the vest further includes a second receiver configured to receive the second signal from the second transmitter.

2. The system according to claim 1, wherein the first feedback circuit includes at least one circuit configured to actuate a first plurality of motors.

3. The system according to claim 1, wherein the first signal indicates a first feedback response, and the second signal indicates a second feedback response.

4. The system according to claim 1, wherein the first signal is a first infrared signal at a first wavelength, and the second signal is a second infrared signal at a second wavelength.

5. The system according to claim 1, wherein the vest further includes a second feedback circuit configured to provide feedback in response to the second signal.

6. The system according to claim 5, wherein the first feedback circuit is disposed on a first portion of the vest, and the second feedback circuit is disposed on a second portion of the vest.

7. The system according to claim 5, wherein the first feedback circuit includes at least one circuit configured to actuate a first plurality of motors, and the second feedback circuit includes at least one circuit configured to actuate a second plurality of motors.

8. The system according to claim 7, wherein each motor of the first plurality of motors includes a shaft and a weight disposed on the shaft, and each motor of the second plurality of motors includes a shaft and a weight disposed on the shaft of the motor of the second plurality of motors.

9. The system according to claim 1, wherein the game controller further includes a plurality of motors configured to provide feedback in response to action occurring during execution of the video game, wherein each motor of the plurality of motors includes a shaft and a weight disposed on the shaft.

10. The system according to claim 1, wherein the game controller further includes a switch configured to enable or disable the first feedback circuit.

11. The system according to claim 1, wherein the first feedback circuit includes a processor and a memory operatively coupled to the processor, the memory having stored thereon instructions which when executed by the processor cause actuation of a plurality of motors in response to the first signal.

12. The system according to claim 1, wherein the vest further includes a first infrared filter disposed between the first receiver and the first transmitter.

13. The system according to claim 1, wherein the vest further includes a rechargeable battery.

14. The system according to claim 1, wherein the first transmitter is selected from the group consisting of a WIFI transmitter, a Bluetooth transmitter, a Near Field Communication transmitter, and an Infrared transmitter.

15. A video gaming vest configured to provide feedback in response to receiving a wireless communication from a game controller, the vest comprising:
    a first receiver configured to receive a first signal from a game controller;
    a second receiver configured to receive a second signal from a game controller;
    a first feedback circuit configured to provide feedback in response to the first signal, the first feedback circuit being disposed on a first portion of the vest; and
    a second feedback circuit configured to provide feedback in response to the second signal, the second feedback circuit being disposed on a second portion of the vest, wherein the first feedback circuit includes a processor and a memory operatively coupled to the processor, the memory having stored thereon instructions which when executed by the processor cause actuation of a first plurality of motors in response to the first signal.

16. The vest according to claim 15, wherein the second feedback circuit includes at least one circuit configured to actuate a second plurality of motors.

17. The vest according to claim 16, wherein each motor of the first plurality of motors includes a shaft and a weight disposed on the shaft, and each motor of the second plurality of motors includes a shaft and a weight disposed on the shaft of the motor of the second plurality of motors.

18. The vest according to claim 15, further comprising a first infrared filter disposed between the first receiver and the first transmitter.

19. A system for providing feedback in response to a video game, the system comprising:
    a game controller configured to generate a wireless communication and including a first transmitter configured to transmit a first signal; and
    a vest configured to provide feedback in response to receiving the wireless communication from the game controller, the vest including:

a first receiver configured to receive the first signal from the first transmitter; and a first feedback circuit configured to provide feedback in response to the first signal, wherein the game controller further includes a plurality of motors configured to provide feedback in response to action occurring during execution of the video game, wherein each motor of the plurality of motors includes a shaft and a weight disposed on the shaft.

* * * * *